(No Model.)

W. VANDERMAN.
PIPE CONNECTION.

No. 471,247.  Patented Mar. 22, 1892.

Witnesses
H. A. Giddings
G. B. Jenkins

Inventor
William Vanderman
by Chas. L. Burdett
Atty

UNITED STATES PATENT OFFICE.

WILLIAM VANDERMAN, OF WILLIMANTIC, CONNECTICUT.

PIPE CONNECTION.

SPECIFICATION forming part of Letters Patent No. 471,247, dated March 22, 1892.

Application filed July 9, 1891. Serial No. 398,918. (No model.)

*To all whom it may concern:*

Be it known that I, WILLIAM VANDERMAN, of Willimantic, in the county of Windham and State of Connecticut, have invented certain new and useful Improvements in Pipe Connections, of which the following is a full, clear, and exact description, whereby any one skilled in the art can make and use the same.

My invention relates to the class of devices that are used in connection with pipe-fittings for the purpose of uniting different lengths of pipes and also joints and parts, particularly in steam-heating work; and the object of my invention is to provide a "union," as it is called, with convenient means for rotating the same without requiring the use of a special tool.

My invention consists in the details of the several parts making up the device as a whole, and in their combination, as more particularly hereinafter described, and pointed out in the claims.

Figure 1:
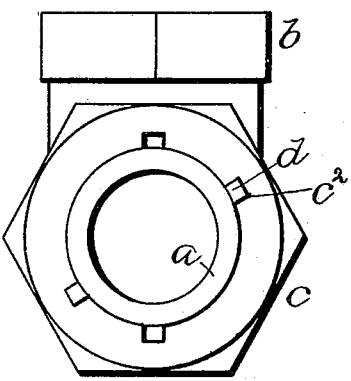
Figure 2:
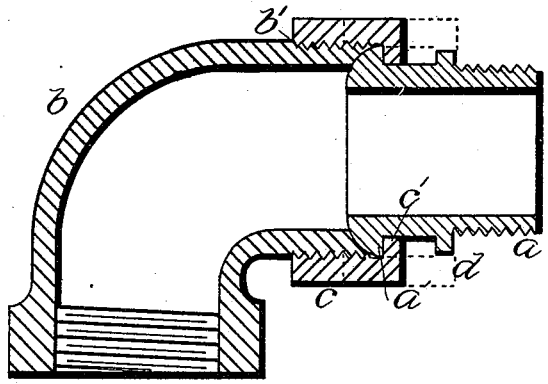

Referring to the drawings, Figure 1 is a detail end view of an elbow coupling nut and union embodying my invention. Fig. 2 is a detail side view in lengthwise section of these parts.

In the accompanying drawings, the letter $a$ denotes the "union," as a short piece of threaded pipe used for connecting pipes and fittings is usually called; $b$, an elbow having the outside thread $b'$ on one end, and $c$ a nut having a flange $c'$ on one side that is adapted to engage the shoulder $a'$ on the end of the union that is to be held in contact with the elbow. As these parts have been constructed prior to my invention the union $a$ is provided on the inside with inwardly-projecting lugs located on diametrically-opposite sides of the interior of the union, and the purpose of these lugs is to provide shoulders or points to be used in connection with a tool that is inserted in the union for the purpose of screwing it into a piece of pipe or a fitting. This is the only means provided for conveniently securing the union in place without grasping it from the outside, which endangers the thread, the piece being so short as to have little except threaded surfaces exposed on the outside. These interior lugs are obstacles to the free flow of fluid through the pipes and are inconvenient for the reason that a special tool is required to turn the union, and that it is inconvenient and at times impossible to use the tool properly in certain locations of the joints in pipe-fitting.

My improvement resides in providing the outside of the union with a lug $d$, located at a distance from either end of the union and making in the flange $c'$ of the nut $c$ an opening through which the lug can readily pass, the opening $c^2$ being of a size and width to form a socket, so as to enable the collar to engage the union and allow the nut to be used as a means for turning the union to secure it into place or to unscrew it. A plural number of these lugs and lengthwise sockets through the flange of the nut are usually provided, the lug being made of a length sufficient to adapt it to form a secure holding-point to enable the nut to be rotated and turn with it the union, the lug being located at such distance from the end of the union as to enable a coupling-nut to engage with it, while the threaded union is out of engagement with the threaded portion of the pipe or joint to which the nut is to be afterward secured.

The nut is usually six-sided, and this allows it to be grasped and rotated even when there is but limited space for the swinging movement of the wrench necessary to rotate the nut. As soon as the union is screwed home the nut is slipped lengthwise on and out of engagement with the lugs $d$ and is then secured to the thread on the part to which the union is to be attached and turned home. The nut is thus used as a means of turning the union, as well as for the purpose of securing it to the adjacent pipe or other fitting. The number and shape of these interengaging parts are immaterial, provided they are so placed that the union and the nut may be temporarily connected, so that by rotating the nut the union may be turned.

I claim as my invention—

1. In combination with a union having a threaded end, a flanged nut fitting upon the union, the outer surface of the union and the inner edge of the flange of the nut having corresponding engaging parts, whereby the union may be rotated by turning the nut, all substantially as described.

2. In combination with a pipe-union having a projecting lug at a distance from either end, a flanged nut having in the flange a lengthwise socket adapted to engage the projection on the outside of the union, all substantially as described.

WILLIAM VANDERMAN.

Witnesses:
R. B. CHAMBERLIN,
JAMES T. LYNCH.